US008529870B2

(12) United States Patent
Roth et al.

(10) Patent No.: US 8,529,870 B2
(45) Date of Patent: Sep. 10, 2013

(54) CRYSTALLINE MOLECULAR SIEVE EMM-7, ITS SYNTHESIS AND USE

(75) Inventors: Wieslaw J. Roth, Sewell, NJ (US); Thomas Yorke, Toms River, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 721 days.

(21) Appl. No.: 11/891,408

(22) Filed: Aug. 10, 2007

(65) Prior Publication Data

US 2009/0041658 A1  Feb. 12, 2009

(51) Int. Cl.
*C01B 33/36* (2006.01)

(52) U.S. Cl.
USPC .......................... 423/718; 423/700

(58) Field of Classification Search
USPC ....................................... 423/718
See application file for complete search history.

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 3,130,007 A | 4/1964 | Breck | |
| 3,247,195 A | 4/1966 | Kerr | |
| 3,314,752 A | 4/1967 | Kerr | |
| 3,354,078 A | 11/1967 | Miale et al. | |
| 3,702,886 A | 11/1972 | Argauer et al. | |
| 3,709,979 A | 1/1973 | Chu | |
| 3,832,449 A | 8/1974 | Rosinski et al. | |
| 3,972,983 A | 8/1976 | Ciric | |
| 4,016,245 A | 4/1977 | Plank et al. | |
| 4,076,842 A | 2/1978 | Plank et al. | |
| 4,533,649 A * | 8/1985 | Ball et al. | 502/71 |
| 4,954,325 A | 9/1990 | Rubin et al. | |
| 4,956,166 A | 9/1990 | Verduijn | |
| 4,981,663 A | 1/1991 | Rubin | |
| 2003/0012729 A1 * | 1/2003 | Dhingra | 423/705 |
| 2008/0170987 A1 * | 7/2008 | Lewis et al. | 423/718 |

* cited by examiner

*Primary Examiner* — Melvin C Mayes
*Assistant Examiner* — Sheng H Davis
(74) *Attorney, Agent, or Firm* — Ann Mareschal; David M. Weisberg

(57) ABSTRACT

The crystalline molecular sieve material EMM-7 has, in its as-synthesized form, an X-ray diffraction pattern including d-spacing maxima substantially as set forth in Table 1:

TABLE 1

| Interplanar d-Spacing (Å) | Relative Intensity, $I/I_o \times 100$ |
|---|---|
| 8.40 ± 0.2 | w-m |
| 6.80 ± 0.2 | w-s |
| 4.46 ± 0.1 | m-s |
| 3.73 ± 0.1 | m-s |
| 3.68 ± 0.1 | m-s |
| 3.40 ± 0.1 | s-vs | wherein "vs" means very strong (greater than 60 to 100), "s" means strong (greater than 40 to 60), "m" means medium (greater than 20 to 40) and "w" means weak (0 to 20).

8 Claims, No Drawings

CRYSTALLINE MOLECULAR SIEVE EMM-7, ITS SYNTHESIS AND USE

FIELD

The present invention relates to a new crystalline molecular sieve material, designated EMM-7, and to processes for its synthesis and use.

BACKGROUND

Zeolitic materials, both natural and synthetic, have been demonstrated in the past to have utility as adsorbent materials and to have catalytic properties for various types of hydrocarbon conversion reactions. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates and substituted silicates, in which the silicon is partially or completely replaced by other tetravalent elements. These silicates can be described as a rigid three-dimensional framework of $SiO_4$ tetrahedra and optionally tetrahedra of a trivalent element oxide, e.g., $AlO_4$, in which the tetrahedra are cross-linked by the sharing of oxygen atoms whereby the ratio of the total trivalent element and silicon atoms to oxygen atoms is 1:2. The electrovalence of the tetrahedra containing the trivalent element is balanced by the inclusion in the crystal of a cation, for example an alkali metal or an alkaline earth metal cation. This can be expressed wherein the ratio of the trivalent element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), to name merely a few.

The general method of zeolite synthesis involves dissolving a source of a trivalent metal oxide, such as alumina, into an aqueous solution of sodium or potassium hydroxide. A source of silica or other tetravalent element oxide in the form of an aqueous slurry is then added to the solution, often together with an organic template, and the resulting gel stirred until homogenous. The gel is then transferred to a reaction autoclave and aged at temperatures of between 50° C. and 250° C. for time periods ranging from hours to days, depending on the zeolite required. The initial reaction gel composition has little resemblance to the chemical stoichiometry of the final zeolite product. In addition, the reaction gel is rich in sodium or potassium hydroxide depending on which final zeolite product is required.

For example, U.S. Pat. No. 4,956,166 discloses a process for the preparation of zeolite L, in which an alkaline reaction mixture comprising water, a source of alkali metal $M^1$, preferably potassium, a source of silicon and a source of aluminum is heated to a temperature of at least 75° C. to form the zeolite L, characterized in that the reaction mixture comprises a source of copper and has a composition falling within the following molar ratios (expressed as oxides):

| | |
|---|---|
| $(M^1_2O + CuO)/SiO_2$ | 0.18-0.36 |
| $H_2O/(M^1_2O + CuO)$ | 25-90 |
| $SiO_2/Al_2O_3$ | 5-15 |
| $M^1_2O/(M^1_2O + CuO)$ | 0.900-0.9999. |

According to the present invention a novel molecular sieve material, designated EMM-7, has now been synthesized in an aqueous reaction mixture containing potassium hydroxide and in the absence of an organic directing agent. Based on measurements of its porosity and acid activity, EMM-7 has utility as an adsorbent and/or a catalyst for organic conversion reactions.

SUMMARY

In one aspect, the present invention resides in a crystalline molecular sieve material, designated EMM-7, which in its as-synthesized form is characterized by an X-ray diffraction pattern including d-spacing maxima substantially as set forth in Table 1 below.

In one embodiment, the crystalline material is an aluminosilicate compound having, in its as-synthesized, anhydrous form, a composition in terms of mole ratios of oxides, in the range:

0.8-1.5$K_2O$:$Al_2O_3$:10-50 $SiO_2$.

In a further aspect, the present invention resides in a process of synthesizing the crystalline molecular sieve material designated EMM-7, which process comprises:

(a) forming a reaction mixture containing at least one source of potassium, at least one source of an oxide of trivalent element X, at least one source of an oxide of tetravalent element Y, and water, the reaction mixture having a composition, in terms of mole ratios of oxides, within the following ranges:

| | |
|---|---|
| $YO_2/X_2O_3$ | 5 to 200 |
| $H_2O/YO_2$ | 5 to 60 |
| $OH^-/YO_2$ | 0.001 to 1 |
| $K/YO_2$ | 0.001 to 1; |

(b) maintaining said reaction mixture under conditions sufficient to form crystals of said EMM-7; and
(c) recovering said crystals from the reaction mixture.

DETAILED DESCRIPTION OF THE EMBODIMENTS

The crystalline molecular sieve material of this invention, EMM-7, is a single crystalline phase which can be prepared in essentially pure form with little or no detectable impurity crystal phases and has an X-ray diffraction pattern which in its as-synthesized, uncalcined form includes the d-spacing maxima listed in Table 1:

TABLE 1

| Interplanar d-Spacing (Å) | Relative Intensity, I/I$_o$ × 100 |
|---|---|
| 8.40 ± 0.2 | w-m |
| 6.80 ± 0.2 | w-s |
| 4.46 ± 0.1 | m-s |
| 3.73 ± 0.1 | m-s |
| 3.68 ± 0.1 | m-s |
| 3.40 ± 0.1 | s-vs |

Generally, the as-synthesized form of EMM-7 has an X-ray diffraction pattern including the d-spacing maxima listed in Table 2:

TABLE 2

| Interplanar d-Spacing (Å) | Relative Intensity, I/I$_o$ × 100 |
|---|---|
| 8.40 ± 0.2 | w-m |
| 6.80 ± 0.2 | w-s |
| 6.02 ± 0.15 | w-m |
| 5.52 ± 0.15 | w-m |
| 4.46 ± 0.1 | m-s |
| 4.44 ± 0.1 | m-s |
| 3.73 ± 0.1 | m-s |
| 3.68 ± 0.1 | m-s |
| 3.40 ± 0.1 | s-vs |
| 3.05 ± 0.1 | w-m |

In Tables 1 and 2, the interplanar spacings, d's, are calculated in Angstrom units (Å), and the relative intensities of the lines, I/I$_o$, where the intensity of the strongest line above background, I$_o$, is counted as 100, are derived with the use of a profile fitting routine (or second derivative algorithm). The intensities are uncorrected for Lorentz and polarization effects. The relative intensities are given in terms of the symbols VS (or vs)=very strong (greater than 60 to 100), S (or s)=strong (greater than 40 to 60), M (or m)=medium (greater than 20 to 40) and W (or w)=weak (0 to 20). It should be understood that diffraction data listed as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

In one embodiment, the present crystalline material is an aluminosilicate compound having, in its as-synthesized, anhydrous form, a composition in terms of mole ratios of oxides, in the range:

0.8-1.5K$_2$O:Al$_2$O$_3$:10-50 SiO$_2$ or more preferably:

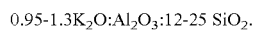

0.95-1.3K$_2$O:Al$_2$O$_3$:12-25 SiO$_2$.

The crystalline molecular sieve material described herein may be prepared from a hydrothermal reaction mixture containing at least one source of potassium, at least one source of an oxide of trivalent element X, e.g., aluminum, at least one source of an oxide of tetravalent element Y, e.g., silicon, and water, the hydrothermal reaction mixture having a composition, in terms of mole ratios of oxides, within the following ranges:

TABLE 3

| Reactants | Useful | Preferred |
|---|---|---|
| YO$_2$/X$_2$O$_3$ | 5 to 200 | 15-100 |
| H$_2$O/YO$_2$ | 5 to 60 | 5-35 |
| OH$^-$/YO$_2$ | 0.001-1 | 0.2-0.6 |
| K/YO$_2$ | 0.001-1 | 0.2-0.6 |

The source of silicon used in the above mixture may be a silicate, e.g., fumed silica, such as Aerosil (available from Degussa), a tetraalkyl orthosilicate, or an aqueous colloidal suspension of silica, for example that sold by E.I. du Pont de Nemours under the tradename Ludox. Examples of suitable aluminum sources include hydrated aluminum oxides, such as boehmite and pseudoboehmite.

Crystallization of the EMM-7 can be carried out at either static or stirred conditions in a suitable reactor vessel, such as for example, polypropylene jars or teflon lined or stainless steel autoclaves, at a temperature of about 95° C. to about 250° C. for a time sufficient for crystallization to occur at the temperature used, e.g., from about 12 hours to about 30 days. Thereafter, the crystals are separated from the liquid and recovered. After recovery, the crystals can be subjected to a variety of conventional post synthesis techniques, especially ammonium ion exchange and calcination to convert the molecular sieve from its potassium form to its catalytically active hydrogen form.

It should be realized that the reaction mixture components can be supplied by more than one source. The reaction mixture can be prepared either batch-wise or continuously. Crystal size and crystallization time of the new crystalline material will vary with the nature of the reaction mixture employed and the crystallization conditions.

Synthesis of the EMM-7 may be facilitated by the presence of at least 0.01 percent, preferably at least 0.10 percent and still more preferably at least 1 percent, seed crystals (based on total weight) of crystalline product.

In its active form, EMM-7 exhibits significant acid activity, with an alpha value well in excess of 1. In this respect, alpha value is an approximate indication of the catalytic cracking activity of a catalyst compared to a standard catalyst and it gives the relative rate constant (rate of normal hexane conversion per volume of catalyst per unit time). It is based on the activity of silica-alumina cracking catalyst taken as an alpha value of 1 (Rate Constant=0.016 sec-1). The Alpha Test is described in U.S. Pat. No. 3,354,078; in the Journal of Catalysis 4, 527 (1965); 6, 278 (1966); and 61, 395 (1980), each incorporated herein by reference as to that description. The experimental conditions of the test used herein include a constant temperature of 538° C. and a variable flow rate as described in detail in the Journal of Catalysis 61, 395 (1980).

The crystalline material described herein can be used to adsorb dry gases and liquids; for selective molecular separation based on size and polar properties; as an ion-exchanger; as a catalyst in organic conversion reactions, such as cracking, hydrocracking, disproportionation, alkylation, isomerization, oxidation and synthesis of monoalkylamines and dialkylamines; as a chemical carrier; in gas chromatography; and in the petroleum industry to remove normal paraffins from distillates.

When used as a catalyst, the present crystalline material can be intimately combined with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a trivalent element, e.g., aluminum, is in the structure, impregnated therein or intimately physically admixed therewith. Such component can be impregnated in or on to crystalline material such as, for example, by, in the case of platinum, treating EMM-7 with a solution containing a platinum metal-containing ion. Thus, suitable platinum compounds for this purpose include chloroplatinic acid, platinous chloride and various compounds containing the platinum amine complex.

The present crystalline material, when employed either as an adsorbent or as a catalyst in an organic compound conversion process is preferably dehydrated, at least partially. This can be done by heating to a temperature in the range of 100° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the EMM-7 in a vacuum, but a longer time is required to obtain a sufficient amount of dehydration.

As in the case of many catalysts, it may be desirable to incorporate EMM-7 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with EMM-7 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new material can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of EMM-7, preferably finely divided, and inorganic oxide matrix may vary widely, with the EMM-7 content ranging e.g. from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following Examples are presented.

EXAMPLE 1

9.9 g of water, 2 g of 45% KOH and 5 g of 10% KOH solutions are mixed with 0.6 g of Al(OH)$_3$ powder (~53% alumina) in a plastic autoclavable bottle. Ludox HS-40 silica (40 wt % silica, 60 wt % water, available from Dupont Chemcial Co.) is added (12.5 g) and the mixture homogenized by shaking.

The bottle is sealed, heated in a Parr autoclave filled with water at 190° C. and sampled at 120, 140 and 170 hrs. The final product is found to be predominantly EMM-7 based on the unique principal X-ray diffraction peaks with the positions and intensities as in Table 4:

TABLE 4

| 2-Theta | D(Å) | Intensity |
|---|---|---|
| 10.52 | 8.40 | m |
| 12.99 | 6.81 | m |
| 14.71 | 6.02 | w |
| 16.03 | 5.53 | w |
| 19.82 | 4.48 | m |
| 19.96 | 4.44 | m |
| 23.90 | 3.72 | m-s |
| 24.18 | 3.68 | m-s |
| 26.16 | 3.40 | s |
| 29.14 | 3.06 | m |

Table 5 is the listing of all X-ray diffraction peaks for the as-synthesized product.

TABLE 5

| 2-Theta | d (Å) | Int. |
|---|---|---|
| 7.957 | 11.10 | v w |
| 10.52 | 8.40 | m |
| 12.985 | 6.81 | m |
| 14.713 | 6.02 | w |
| 16.025 | 5.53 | w |
| 19.821 | 4.48 | m |
| 19.959 | 4.44 | m |
| 20.535 | 4.32 | w |
| 21.702 | 4.09 | m, br |
| 22.905 | 3.88 | w |
| 23.903 | 3.72 | ms |
| 24.181 | 3.68 | m s |
| 25.035 | 3.55 | w |
| 26.162 | 3.40 | s |
| 26.72 | 3.33 | w |
| 27.313 | 3.26 | w |
| 28.063 | 3.18 | w |
| 28.518 | 3.13 | w |
| 29.142 | 3.06 | m |
| 29.656 | 3.01 | w |
| 30.728 | 2.91 | w |
| 31.344 | 2.85 | w |
| 32.081 | 2.79 | w |
| 32.481 | 2.75 | w |
| 33.302 | 2.69 | w |
| 35.838 | 2.50 | w m |
| 36.299 | 2.47 | w |
| 36.84 | 2.44 | w |

TABLE 5-continued

| 2-Theta | d (Å) | Int. |
|---|---|---|
| 37.62 | 2.39 | w |
| 38.509 | 2.34 | w |
| 39.412 | 2.28 | w |

The as-synthesized product has the following composition: 72% silica, 5.66% alumina, 5.66% K and 0.31% Na. Cation exchange with 2 M ammonium nitrate solution, 3 treatments at room temperature, demonstrates exchangeability of the alkali cations resulting, after calcinations, in the following composition of the solid product: silica 79.4%, alumina 6.69%, K 0.3% and Na 0.01%.

Nitrogen adsorption/desorption tests reveal the product to have a BET surface area of 189 m$^2$/g and 0.077 cm$^3$/g micropore volume. Measurement of nitrogen sorption isotherms and of BET surface area is well known in the art, e.g. as ASTM Method D 4365-95 "Standard Test Method for Determining Micropore Volume and Zeolite Area of Catalysts". Alpha test shows catalytic activity towards hydrocarbons, with an alpha value of 9.

EXAMPLE 2

1.9 g of water and 15 g of 10% KOH solution are mixed with 0.6 g of Al(OH)$_3$ powder (~53% alumina) in a plastic autoclavable bottle. Ludox HS-40 silica is added (12.5 g) and the mixture homogenized by shaking.

The bottle is sealed, heated in a Parr autoclave filled with water at 190° C. and discharged, filtered and washed with water after 180 hrs. The final product is found to be predominantly EMM-7 based on the unique principal X-ray diffraction peaks with the positions and intensities as in Table 6 below.

The as-synthesized product has the following composition: 74.4% silica, 7.13% alumina, 7.39% K and 0.13% Na. Cation exchange with 1 M ammonium nitrate solution, 3 treatments at room temperature, demonstrates exchangeability of the alkali cations resulting, after calcinations, in the following composition of the solid product: silica 81.7%, alumina 7.71%, K 0.55% and Na 0.018%.

Nitrogen adsorption/desorption tests reveal the product to have a BET surface area of 197 m$^2$/g and 0.077 cm$^3$/g micropore volume.

TABLE 6

| 2-Theta | d(Å) | Intensity |
|---|---|---|
| 8.012 | 11.0255 | W |
| 9.955 | 8.8783 | W |
| 10.522 | 8.401 | M |
| 12.519 | 7.0649 | W |
| 13.02 | 6.7941 | M |
| 14.736 | 6.0065 | W |
| 16.076 | 5.5088 | W |
| 18.509 | 4.7899 | W |
| 19.843 | 4.4707 | M |
| 20.499 | 4.329 | W |
| 21.169 | 4.1936 | W |
| 21.7 | 4.0922 | W |
| 22.511 | 3.9465 | W |
| 22.938 | 3.8741 | W |
| 23.938 | 3.7144 | VS |
| 24.2 | 3.6747 | S |
| 25.224 | 3.5278 | W |
| 25.827 | 3.4468 | W |
| 26.183 | 3.4008 | Vs |
| 26.812 | 3.3224 | W |

TABLE 6-continued

| 2-Theta | d(Å) | Intensity |
|---|---|---|
| 28.133 | 3.1693 | W |
| 28.556 | 3.1234 | W |
| 29.179 | 3.058 | W |
| 29.642 | 3.0113 | W |
| 30.48 | 2.9304 | W |
| 31.306 | 2.855 | W |
| 32.122 | 2.7843 | W |
| 33.324 | 2.6865 | W |
| 33.842 | 2.6466 | W |
| 35.919 | 2.4982 | W |
| 36.402 | 2.4661 | W |
| 36.857 | 2.4367 | W |
| 37.543 | 2.3938 | W |
| 38.446 | 2.3396 | W |
| 39.026 | 2.3061 | W |

EXAMPLE 3

0.12 g of Al(OH)$_3$ powder (~53% alumina) is added to 126 g of water with 36 g of LUDOX-HS-40 in a 250 ml plastic autoclavable bottle and shaken to homogenize. 12 g of 45.5% KOH is added to the mixture.

The bottle is sealed, heated in a Parr autoclave filled with water at 190° C. and discharged, filtered and washed with water after 200 hrs. The final product is found to be predominantly EMM-7 based on the unique principal X-ray diffraction peaks with the positions and intensities as in Table 7:

TABLE 7

| 2-Theta | d(A) | Intensity |
|---|---|---|
| 7.96 | 11.10 | W |
| 9.91 | 8.92 | W |
| 10.48 | 8.43 | M |
| 10.76 | 8.22 | W |
| 12.96 | 6.82 | M |
| 13.92 | 6.36 | W |
| 14.68 | 6.03 | W |
| 16.00 | 5.53 | W |
| 18.50 | 4.79 | W |
| 18.87 | 4.70 | W |
| 19.80 | 4.48 | S |
| 19.94 | 4.45 | VS |
| 20.46 | 4.34 | W |
| 21.00 | 4.23 | W |
| 21.66 | 4.10 | W |
| 22.46 | 3.95 | W |
| 22.88 | 3.88 | W |
| 23.88 | 3.72 | VS |
| 24.14 | 3.68 | VS |
| 26.14 | 3.41 | VS |
| 26.66 | 3.34 | M |
| 26.78 | 3.33 | W |
| 27.28 | 3.27 | W |
| 28.03 | 3.18 | W |
| 28.48 | 3.13 | W |
| 29.12 | 3.06 | M |
| 29.60 | 3.02 | W |
| 30.60 | 2.92 | W |
| 31.31 | 2.85 | W |
| 32.04 | 2.79 | W |
| 32.38 | 2.76 | W |
| 33.34 | 2.69 | W |
| 33.74 | 2.65 | W |
| 34.20 | 2.62 | W |
| 35.46 | 2.53 | W |
| 35.80 | 2.51 | W |
| 36.38 | 2.47 | W |
| 36.70 | 2.45 | W |
| 37.50 | 2.40 | W |
| 38.42 | 2.34 | W |

What is claimed is:

1. A single crystalline phase molecular sieve material having, in its as-synthesized, uncalcined form, an X-ray diffraction pattern including d-spacing maxima substantially as set forth in Table 1, wherein the d- spacing maxima set forth in Table 1 represent the principal d-spacing maxima such that the molecular sieve material contains no additional strong or very strong maxima not set forth in Table 1:

TABLE 1

| Interplanar d-Spacing (Å) | Relative Intensity, $I/I_o \times 100$ |
|---|---|
| 8.40 ± 0.2 | w-m |
| 6.80 ± 0.2 | w-s |
| 4.46 ± 0.1 | m-s |
| 3.73 ± 0.1 | m-s |
| 3.68 ± 0.1 | m-s |
| 3.40 ± 0.1 | s-vs | wherein "vs" means very strong (greater than 60 to 100), "s" means strong (greater than 40 to 60), "m" means medium (greater than 20 to 40) and "w" means weak (0 to 20).

2. The crystalline molecular sieve material of claim 1 having, in its as-synthesized, anhydrous form, a composition in terms of mole ratio of oxides in the range:

0.8-1.5$K_2O$:$Al_2O_3$:10-50 $SiO_2$.

3. The crystalline molecular sieve material of claim 1 having, in its as-synthesized, anhydrous form, a composition in terms of mole ratio of oxides in the range:

0.95-1.3$K_2O$: $Al_2O_3$: 12-25 $SiO_2$.

4. The single crystalline phase molecular sieve material of claim 1, wherein "w" or weak indicates a non-zero relative intensity up to 20.

5. A single crystalline phase molecular sieve material having, in its as-synthesized, uncalcined form, an X-ray diffraction pattern including d-spacing maxima substantially as set forth in Table 2:

TABLE 2

| Interplanar d-Spacing (Å) | Relative Intensity, $I/I_o \times 100$ |
|---|---|
| 8.40 ± 0.2 | w-m |
| 6.80 ± 0.2 | w-s |
| 6.02 ± 0.15 | w-m |
| 5.52 ± 0.15 | w-m |
| 4.46 ± 0.1 | m-s |
| 4.44 ± 0.1 | m-s |
| 3.73 ± 0.1 | m-s |
| 3.68 ± 0.1 | m-s |
| 3.40 ± 0.1 | s-vs |
| 3.05 ± 0.1 | w-m | wherein "vs" means very strong (greater than 60 to 100), "s" means strong (greater than 40 to 60), "m" means medium (greater than 20 to 40) and "w" means weak indicating a non-zero relative intensity up to 20.

6. The crystalline molecular sieve material of claim 5 having, in its as-synthesized, anhydrous form, a composition in terms of mole ratio of oxides in the range:

0.8-1.5$K_2O$:$Al_2O_3$:10-50 $SiO_2$.

7. The crystalline molecular sieve material of claim 5 having, in its as-synthesized, anhydrous form, a composition in terms of mole ratio of oxides in the range:

0.95-1.3$K_2O$:$Al_2O_3$:12-25 $SiO_2$.

8. The single crystalline phase molecular sieve material of claim 5, wherein the d-spacing maxima set forth in Table 2 represent the principal d-spacing maxima, such that the molecular sieve material contains no additional strong or very strong maxima not set forth in Table 2.